Jan. 13, 1953 C. J. CARTWRIGHT 2,625,053
HAND BRAKE ASSEMBLY
Filed May 9, 1950 2 SHEETS—SHEET 1
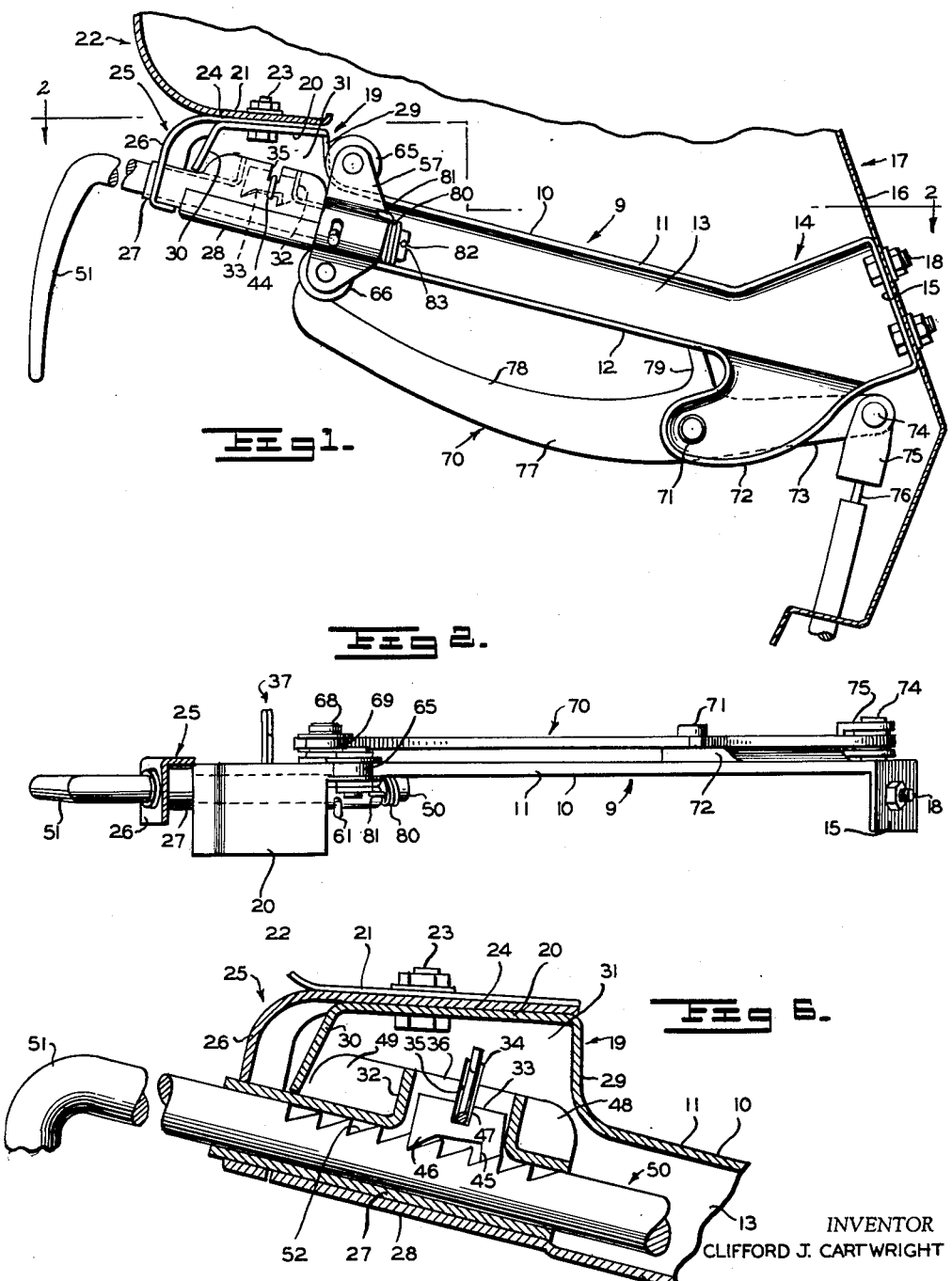
INVENTOR
CLIFFORD J. CARTWRIGHT
BY George Rex Frye
ATTORNEY

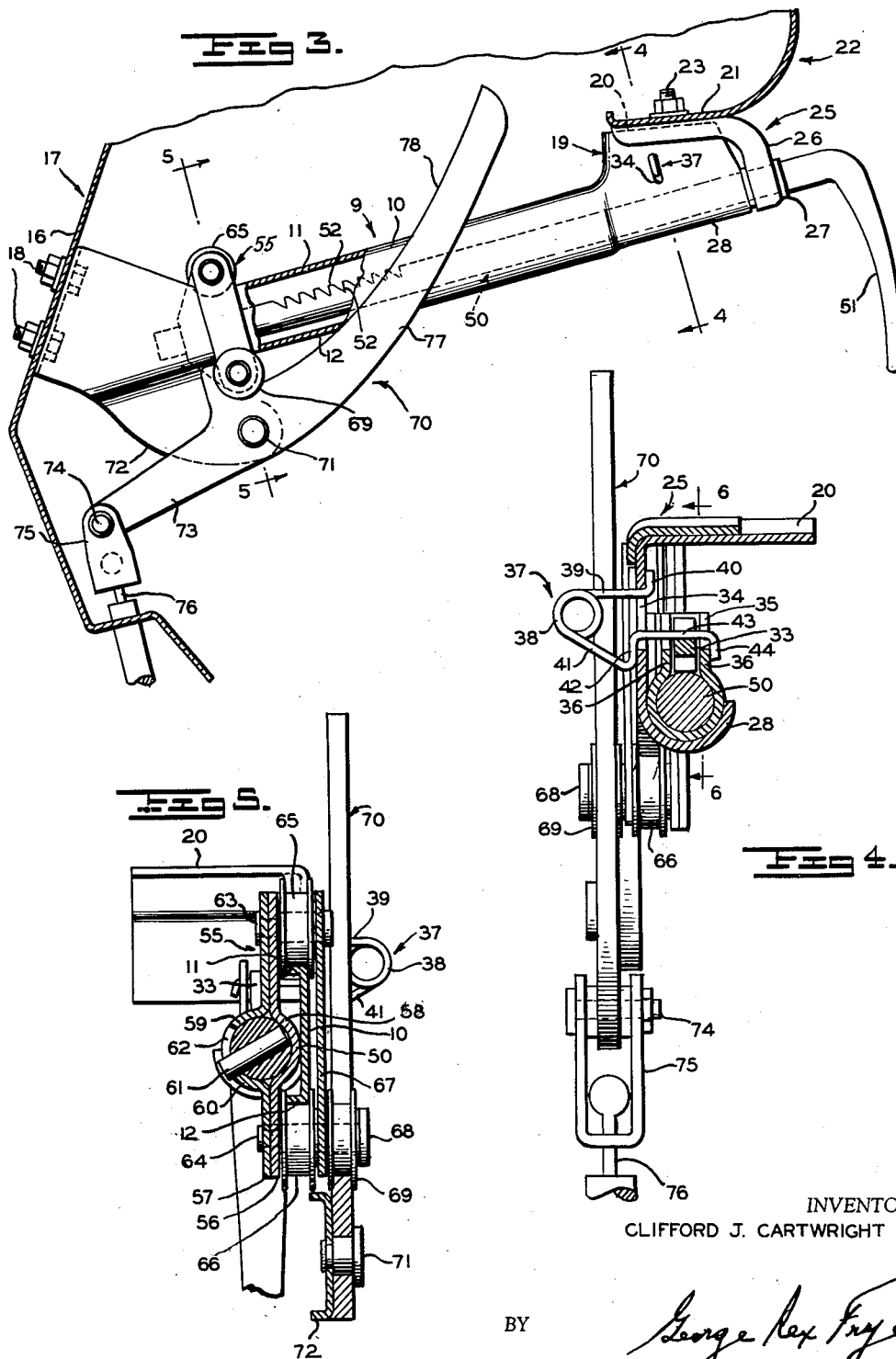

Patented Jan. 13, 1953

2,625,053

UNITED STATES PATENT OFFICE 2,625,053

HAND BRAKE ASSEMBLY

Clifford J. Cartwright, Pontiac, Mich., assignor to American Forging and Socket Company, Pontiac, Mich., a corporation of Michigan Application May 9, 1950, Serial No. 160,985

13 Claims. (Cl. 74—503)

This invention relates to an improved hand brake lever assembly of the pull rod, variable ratio type, and more particularly to a device of this kind especially adapted for mounting on the instrument panel and dashboard of an automobile for applying and setting the cable operated parking brakes thereof.

The primary object of the invention is to provide a device of the character indicated above having a minimum number of simplified parts, including a single housing to be secured at opposite ends to the instrument panel and dashboard, a single rod supported for endwise movement in the housing and terminating at its rearward end in a handle or hand grip, a single ratio arm pivoted on the housing having a developed cam surface and securable directly to the brake cable, friction reducing cam follower means on the rod for actuating the ratio arm, and simple spring pressed ratchet pawl means on the housing engageable with ratchet teeth along one side of the rod to hold the rod in brake setting position, the rod being rotatable by means of the handle or hand grip into a position in which the pawl means are disengaged from the ratchet teeth and ride on a smooth side of the rod, so that the rod can move forward freely toward brake releasing position.

Another important object of the invention is to provide a direct acting and rapidly functioning device of the character indicated above wherein in the initial stage of application of the brakes the brake load is at a low ratio of, for example, 1 to 2, but the ratio increases progressively with the increase in the brake load, resulting in a constant load on the brake handle of, for example, 60 pounds with the actual brake load being 300 pounds, representing a 5 to 1 ratio.

Another important object of the invention is to provide in a device of the character indicated above a double ratchet pawl arrangement acting in conjunction with the housing and the ratchet teeth on the pull rod, which affords a fine increment for locking the rod in applied position and for accommodating brake lining wear.

Other important objects and advantageous features of the invention will be apparent from the following description and the accompanying drawings, wherein, for purposes of illustration only, a specific embodiment of the invention is set forth in detail.

In the drawings, wherein like numerals designate like parts throughout the several views:

Figure 1 is a right hand side elevation, partly in section, showing the device in brake applying or setting position.

Figure 2 is a top plan view, taken along the line 2—2 of Figure 1.

Figure 3 is a left hand side elevation, partly in section, showing the device in brake releasing position.

Figure 4 is an enlarged vertical transverse section, taken on the line 4—4 of Figure 3.

Figure 5 is an enlarged transverse vertical section, taken on the line 5—5 of Figure 3; and Figure 6 is an enlarged, fragmentary vertical longitudinal section, taken on the line 6—6 of Figure 4.

Referring in detail to the drawings, the illustrated device comprises the channel cross section housing 9 having the relatively long straight intermediate track portion 10, having the straight upper and lower lateral flanges 11 and 12, respectively, connected by the vertical web or sidewall 13. On the forward end of the track portion 10 is the vertically expanded bracket portion 14, including the vertical end flange 15 in flush engagement with a portion 16 of an automobile dashboard 17 and secured thereto by bolts 18. On the rearward end of the track portion 10 is the upwardly expanded hood 19 providing the elevated horizontal flange 20 parallel with the underside of the under flange 21 of the instrument panel 22 and secured to the flange 21 by bolts 23, passing through the flange 20, the plate 24 of a bracket 25, and the instrument panel flange 21. The plate 24 of the bracket 25 has on its rearward end a downturned portion 26 embracing and secured to the rearward projecting end of the cylindrical slide tube 27 which is secured endwise within the lower part of the hood 19 and conformably engages a semi-circular lower wall 28 which is a continuation of the lower flange 12, as shown in Figures 3 and 4.

Depending from the horizontal flange 20 of the hood 19 is a front wall 29 which may be formed as a continuation of the upper flange 11, and a rear wall 30 which reaches to the slide tube 27, as shown in Figure 6, these walls being connected by a web 31, being a continuation of the side wall 13.

Between the walls 29 and 30 the slide tube 27 has a longitudinally elongated upwardly projecting tubular extension 32 constituting a chamber for the two-tooth ratchet pawl 33, in which the pawl 33 can rise and fall and have limited endwise movement, as well as vertical tilting or rocking movement.

The web 31 is formed with a vertically elongated slot 34 registering with slots 35 formed in the side walls 36 of the tubular extension or pawl chamber 32. The wire ratchet spring 37 comprises a coil 38, located at the left hand side of the housing, from which projects a tangential upper arm 39, extending through the web slot 34 and engaging the upper end thereof, as shown in Figure 4, and provided with a terminal 40 engaging the inner side of the web 31. A downwardly tensioned lower declining tangential arm 41 projects from the coil 38 and has an upset portion 42 engaging the outer side of the web 31 below the lower end of the slot 34, a horizontal portion 43 projecting through the web slot 34 and engaging the lower end of the slot 34, and extending through the pawl chamber slots 35 and having a downturned terminal 44, engaging the outer side of the adjacent pawl chamber side wall 36.

The ratchet pawl 33 comprises a longitudinally elongated block having forward and rearward ratchet teeth 45, 46, respectively, which are spaced at the distance of two and one-half teeth apart. The top of the ratchet pawl is formed with a notch 47 midway between its ends, in which the horizontal portion 43 of the ratchet spring 37 freely engages, to urge the ratchet pawl yieldably in a downward direction, the form and arrangement of the spring 37 and the pawl 33 being such that the spring 37 yields to permit endwise, vertical, and vertical tilting movement of the pawl 33 in the chamber 32. The top of the slide tube 27 has longitudinal positioning flanges 48 and 49 for cooperation with the end walls 29 and 30, respectively, of the hood 19.

The operating rod 50 is straight and of cylindrical cross section to slide and turn freely in the slide tube 27 and is provided on its rearward end with a rigid handle or hand grip 51. The rod 50 is slightly longer than the housing 9 and is formed near its forward end with a series of ratchet teeth 52 for engagement by the pawl 33 in the rearwardly retracted or brake applying position, as shown in Figures 1 and 6. The ratchet teeth 52 are formed on only one side of the rod 50, so that whenever the rod 50 is rotated, by means of the handle 51, out of the position shown in Figure 6, the teeth 45, 46 of the ratchet 33 are elevated out of engagement with the rod teeth 52 by engagement of the adjacent round, smooth exterior of the rod with the ratchet teeth. The ratchet teeth 45, 46 are thereby put in sliding engagement with the smooth, round exterior of the rod 50 and the rod 50 is thereby freed to move forwardly in a brake releasing movement. Teeth 45 and 46 are spaced apart a distance equal to 2½ times the pitch of teeth 52, to provide fine adjustment in the position of rod 50.

On the forward end of the rod 50 is the roller assembly 55 which comprises a pair of triangular, vertical, inner and outer plates 56, 57, respectively, which have semi-cylindrical intermediate portions 58, 59, respectively, registered to define a tubular guide 60 in which the forward end of the rod 50 is rotatable. The rod 50 has a transverse pin 61 projecting into a circumferential slot 62 formed in the outer semi-circular portion 59, whereby the assembly 55 is secured to the rod 50 against endwise movement relative thereto, while permitting sufficient axial rotation of the rod 50 relative to the assembly 55 to enable the rod 50 to be rotated into and out of a pawl-locked position.

As shown in Figure 5, the plates 56, 57 are together mounted at the open or right hand side of the housing 9, with their upper and lower ends secured on horiontal transverse pins 63, 64 which extend above and below the upper and lower flanges 11, 12, respectively, of the track portion 10 of the housing 9. The pins 63, 64 carry flanged rollers 65, 66, rollably engaging and embracing the upper and lower track flanges 11, 12, respectively. The rollers 65, 66 supplement the slide tube 27 in confining the endwise movement of the rod 50 to a straight line, parallel to the track portion 10.

The pins 63, 64 are supportably connected by a plate 67, located at the left hand side of the housing 9, and an extension 68 on the lower pin 64 carries another flanged roller 69 positioned at the outer side of the plate 67, the third roller 69 being arranged for rolling engagement with the ratio arm or lever 70.

The ratio arm or lever 70 consists of a single solid bar pivoted at a point 71 near its forward end on the left hand side of a depending bar 72 on the bracket portion 14 of the housing 9. Extending forwardly from the pivotal point 71 is a short straight lever portion 73 on whose forward end is pivoted at 74 a connection 75 arranged to be connected to the upper end of the brake operating cable 76, which on being pulled upwardly applies the brakes (not shown) to which it is connected.

The main or longer portion 77 of the ratio lever 70 extending rearwardly from the pivotal point 71 has a rearwardly and upwardly curved upper edge 78, constituting a developed cam surface, which is rollably engaged by the third roller 69 of the roller assembly 55. The developed cam surface provided by the upper edge 78 is contoured to provide the desired progressive increase in ratio of brake load to constant rearward pull on the operating rod 50 exerted in applying the brakes.

It will be obvious that with the operating rod 50 in the forward brake releasing position shown in Figure 3 produced by the downward pull of the brake cable 76 upon release of the rod 50 from the rearwardly retracted brake applying position shown in Figure 1, the ratio lever 70 is in an upwardly and rearwardly inclined position and the third roller 69 is in stop engagement with a stop lug 79 rising from the lever above its pivotal point 71. On rearward retraction of the rod 50, the third roller 69 rides rearwardly along the upper edge 78 of the lever 70, thereby progressively depressing the lever 70 and pulling the brake cable 76 upwardly, until the third roller 69 nears the rearward end of the lever 70. Rearward movement of the rod 50 is limited to an extreme retracted position determined by engagement of the upper roller 65 with the wall 29 of the housing portion 19. Ordinarily the rod 50 would not require to be retracted to this extreme rearward position in order to fully apply the brakes.

The roller assembly 55 and its mounting on the track portion 10 of the housing 9 is utilized to provide rotary tension of the operating rod 50 through the agency of a helical spring 80 circumposed on the forward end of the rod 50 having a terminal finger 81 bearing against the right hand or outer side of the outer plate 57 of the roller assembly and a terminal finger 82 positioned in a transverse slot 83 formed in the forward end of the rod, the arrangement being such that the rod 50 normally occupies a position of rotation in which the ratchet teeth 52 engage the teeth of the ratchet pawl when the rod 50 is retracted to apply the brakes, and the rod 50 must be rotated clockwise against the resistance of the spring 80 to disengage the ratchet teeth and release the rod 50 for release of the brakes.

It will be observed that the longitudinal spacing of the teeth 45, 46 of the ratchet pawl, and the freedom of the pawl to move endwise and tilt in the chamber 32, assures quick and positive engagement of the pawl 33 with the rod 50 even though the manual retracting and manual releasing of the rod 50 immediately following such retraction be performed with haste and with some carelessness.

What is claimed is:

1. In combination, a dashboard, an instrument panel spaced rearwardly from said dashboard, a single longitudinally elongated housing having a forward end rigidly secured to said dashboard and a rearward end rigidly secured to said instrument panel, a brake operating cable having a vertical flight positioned beneath the forward end of said housing and arranged to be pulled to apply brakes connected to said cable, a slide tube on a forward part of said housing, an operating rod extending supportably through said slide tube for axial rotation and endwise movements relative to said slide tube, a handle on the rearward end of said operating rod, a longitudinal series of ratchet teeth on one side of said rod, the other sides of the rod being smooth, a ratchet pawl chamber on said slide tube and opening through a side thereof and exposing said rod, a spring pressed ratchet pawl positioned in said chamber and normally engaging said rod, said pawl being arranged to engage said series of ratchet teeth when said rod is in a rearwardly retracted position with said series of ratchet teeth in line with said pawl whereby forward movement of the rod is precluded until said rod is rotated to a position in which said series of ratchet teeth is out of line with said pawl and said pawl slidably engages a smooth side of said rod and said rod is free to move forwardly, a ratio lever pivoted intermediate its ends on a portion of said housing, said ratio lever having a forward end connected to said brake cable and an arm projecting rearwardly along and substantially parallel with said housing from the pivotal point of said lever, said lever arm having a longitudinally curved cam edge, and a roller assembly mounted on the rearward end of said operating rod comprising a roller rollably engaging said cam edge whereby when said operating rod is pulled rearwardly from a forward brake releasing position said ratio lever is swung in a direction to pull said brake cable to apply the brakes.

2. In combination, a dashboard, an instrument panel spaced rearwardly from said dashboard, a single longitudinally elongated housing having a forward end rigidly secured to said dashboard and a rearward end rigidly secured to said instrument panel, a brake operating cable having a vertical flight positioned beneath the forward end of said housing and arranged to be pulled to apply brakes connected to said cable, a slide tube on a forward part of said housing, an operating rod extending supportably through said slide tube for axial rotation and endwise movements relative to said slide tube, a handle on the rearward end of said operating rod, a longitudinal series of ratchet teeth on one side of said rod, the other sides of the rod being smooth, a ratchet pawl chamber on said slide tube and opening through a side thereof and exposing said rod, a spring pressed ratchet pawl positioned in said chamber and normally engaging said rod, said pawl being arranged to engage said series of ratchet teeth when said rod is in a rearwardly retracted position with said series of ratchet teeth in line with said pawl whereby forward movement of the rod is precluded until said rod is rotated to a position in which said series of ratchet teeth is out of line with said pawl and said pawl slidably engages a smooth side of said rod and said rod is free to move forwardly, a ratio lever pivoted intermediate its ends on a portion of said housing, said ratio lever having a forward end connected to said brake cable and an arm projecting rearwardly along and substantially parallel with said housing from the pivotal point of said lever, said lever arm having a longitudinally curved cam edge, and a roller assembly mounted on the rearward end of said operating rod comprising a roller rollably engaging said cam edge whereby when said operating rod is pulled rearwardly from a forward brake releasing position said ratio lever is swung in a direction to pull said brake cable to apply the brakes, said housing having a straight track portion located intermediate its ends having upper and lower tracks, and said roller assembly further comprising upper and lower rollers rollably engaging said upper and lower tracks, respectively, said roller assembly thereby acting in conjunction with said slide tube to support said operating rod for axial rotation and endwise movements.

3. A hand brake assembly comprising a generally horizontal, longitudinally elongated housing having portions on its forward and rearward ends for rigid connection to fixed supports, a straight track portion located intermediate the ends of said housing having upper and lower tracks thereon, a longitudinal slide tube on a rearward part of said housing having a ratchet pawl chamber opening into the interior of said slide tube, a ratchet pawl confined in said chamber for limited longitudinal movements relative to said chamber, spring means acting between a portion on said housing and said pawl and yieldably pressing said pawl radially inwardly with respect to said slide tube, an operating rod slidably confined in said slide tube for axial rotation and endwise movements relative to said slide tube and relative to said housing, a handle on the rearward end of said operating rod for rotating said rod and for pulling said rod rearwardly from a forward released position, a line of ratchet teeth on a side of said rod, other sides of the rod being smooth, positioning means normally imparting a rotary position to said rod in which said line of ratchet teeth is aligned with said ratchet pawl whereby on said rod being pulled rearwardly to brake applying position said pawl can retainably engage said line of ratchet teeth, said positioning means being arranged to yield upon manual rotation of said rod to one side of the aligned position to permit said pawl to become disengaged from said line of ratchet teeth and engage a smooth side of said rod whereby said rod is freed to be moved forwardly toward a brake releasing position, a ratio lever pivotally supported intermediate its ends at a point near the rearward end of said housing track portion, said ratio lever having a cable arm extending forwardly from its pivotal point for operative connection to a brake cable and a ratio arm extending rearwardly from its pivotal point and adjacent said housing, said ratio arm having a rearwardly and upwardly curved cam surface extending therealong, and a roller assembly on the rearward end of said operating rod comprising upper and lower rollers rollably engaging said upper and lower tracks of said track portion of the housing in a manner to supplement said slide tube in confining said operating rod to axial rotation and endwise movements, and another roller rollably engaging said cam surface whereby upon said pulled rod being pulled rearwardly from a forward released position said ratio lever is progressively swung downwardly so as to elevate said cable arm and pull a brake cable connected to said cable arm.

4. A hand brake assembly comprising a housing, a pull rod mounted on said housing and confined to straight line forward and rearward movements relative to said housing, means for rotating said rod and imparting endwise movements thereto, a ratio lever pivoted intermediate its ends on a forward part of said housing having a forwardly extending arm and a rearwardly extending contoured cam arm, roller means on said operating rod rollably engaging said cam arm whereby said ratio lever is swung downwardly as said operating rod is pulled rearwardly and permitted to swing upwardly as said operating rod is moved forwardly and a brake actuating cable secured to said forwardly extending arm, said cam arm being longitudinally contoured to provide progressive increase in mechanical advantage throughout rearward movement of said operating rod from a forward position, a hood on the rearward end of said housing, a slide tube confined in said hood, said pull rod extending rotatably and slidably through said slide tube, a ratchet pawl chamber on said slide tube and opening through a side of said slide tube to expose said pull rod, a line of ratchet teeth on said pull rod arranged to be exposed in said chamber only while said pull rod is in a rearwardly retracted position, a ratchet pawl confined in said chamber for engagement with the line of ratchet teeth on the pull rod, said pull rod having a smooth side with which said ratchet pawl is slidably engageable in a forward position of said pull rod and in the rearwardly retracted position of said pull rod when said rod is rotated to put said line of ratchet teeth out of line with said ratchet pawl, spring means urging said ratchet pawl into engagement with said pull rod, comprising a spring mounted on said hood having a first arm and a second arm, said first arm engaging under a portion on said hood spaced from the back of said ratchet pawl, said second arm being tensioned away from said first arm and engaged with the back of said ratchet pawl.

5. A hand brake assembly comprising a housing, a pull rod mounted on said housing and confined to straight line forward and rearward movements relative to said housing, means for rotating said rod and imparting endwise movements thereto, a ratio lever pivoted intermediate its ends on a forward part of said housing having a forwardly extending arm and a rearwardly extending contoured cam arm, roller means on said operating rod rollably engaging said cam arm whereby said ratio lever is swung downwardly as said operating rod is pulled rearwardly and permitted to swing upwardly as said operating rod is moved forwardly and a brake actuating cable secured to said forwardly extending arm, said cam arm being longitudinally contoured to provide progressive increase in mechanical advantage throughout rearward movement of said operating rod from a forward position, a hood on the rearward end of said housing, a slide tube confined in said hood, said pull rod extending rotatably and slidably through said slide tube, a ratchet pawl chamber on said slide tube and opening through a side of said slide tube to expose said pull rod, a line of ratchet teeth on said pull rod arranged to be exposed in said chamber only while said pull rod is in a rearwardly retracted position, a ratchet pawl confined in said chamber for engagement with the line of ratchet teeth on the pull rod, said pull rod having a smooth side with which said ratchet pawl is slidably engageable in a forward position of said pull rod and in the rearwardly retracted position of said pull rod when said rod is rotated to put said line of ratchet teeth out of line with said ratchet pawl, spring means urging said ratchet pawl into engagement with said pull rod, comprising a spring mounted on said hood having a first arm and a second arm, said first arm engaging under a portion on said hood spaced from the back of said ratchet pawl, said second arm being tensioned away from said first arm and engaged with the back of said ratchet pawl, said ratchet pawl being shorter than said chamber with said second spring arm engaging a point on the back of the pawl midway between the forward and rear ends of said pawl, whereby said ratchet pawl can have limited longitudinal movements relative to said chamber and can tilt endwise and have lateral movements relative to said chamber and said pull rod, against the resistance of said spring means.

6. A hand brake assembly comprising an elongated frame having a straight track portion intermtdiate its ends, a straight guide member carried by said frame adjacent one end and aligned with said track portion, a handled actuating rod carried by said guide and slidable longitudinally and rotatable relative thereto, a roller assembly connected to the end of said rod adjacent said track portion for movement therewith along said track portion, said rod being rotatable about its axis relative to said roller assembly, track engaging roller means on said roller assembly, a lever pivotally connected to said frame including a cam surface extending generally along the track portion of said frame, a roller on said roller assembly engageable with the cam portion of said lever, latch means for said rod releasable upon rotation of said rod, and means on said lever for connecting a brake actuating cable thereto.

7. A hand brake assembly as defined in claim 6 in which said guide member comprises a tubular member, and said rod extends through said tubular member.

8. A hand brake assembly as defined in claim 7, in which said latch means comprises a pawl chamber at one side of said tubular member, a pawl in said chamber, a spring urging said pawl toward said rod, said rod having teeth formed along one side thereof, said pawl having a pair of teeth spaced apart a distance equal to a unitary number times the pitch of the teeth on said rod plus one-half pitch thereof.

9. A hand brake assembly as defined in claim 6 in which said lever is pivoted intermediate its ends to the end of said frame remote from said guide member.

10. A hand brake assembly as defined in claim 9 in which said lever comprises a stop abutment adjacent its pivot axis engageable by the cam engaging roller to limit movement of said rod in one direction.

11. In brake actuating structure of the character described, a straight track having narrow flanges at its opposite edges, a roller assembly movable along said track having a pair of spaced apart flanged track rollers, the flanges of said rollers engaging the sides of the flanges of said track to prevent turning of said assembly about the longitudinal axis of said track, an actuating roller coaxial with one of said track rollers, an actuating rod connected to said assembly and rotatable relative thereto, latch means for said rod releasable upon rotation of said rod, and a brake applying lever having a cam portion engageable by said actuating roller.

12. Structure as defined in claim 11 in which said roller assembly comprises frame structure including a tubular portion in which one end of said rod is journaled, and pin and slot means connecting said rod and tubular portion to permit rotation of said rod relative to said frame structure while providing for movement of said frame roller assembly along said track in response to longitudinal movement of said rod.

13. Structure as defined in claim 12 comprising a torsion spring connecting said rod and frame structure and biasing said rod into position to render said latch means effective.

CLIFFORD J. CARTWRIGHT.

REFERENCES CITED

The following references are of record in the file of this patent:

UNITED STATES PATENTS

| Number | Name | Date |
| --- | --- | --- |
| 2,304,356 | Heller | Dec. 8, 1942 |
| 2,305,225 | Skareen | Dec. 15, 1942 |
| 2,555,811 | Peterson | June 5, 1951 |

FOREIGN PATENTS

| Number | Country | Date |
| --- | --- | --- |
| 669,244 | France | Feb. 6, 1929 |